United States Patent [19]

Dochi

[11] Patent Number: 5,442,357
[45] Date of Patent: Aug. 15, 1995

[54] RADAR TRANSPONDER

[75] Inventor: Tohru Dochi, Hyogo, Japan

[73] Assignee: Mitsubishi Denki Kabushiki Kaisha, Tokyo, Japan

[21] Appl. No.: 203,589

[22] Filed: Mar. 1, 1994

[30] Foreign Application Priority Data

Mar. 25, 1993 [JP] Japan .................. 5-089452

[51] Int. Cl.⁶ .............................. G01S 13/80
[52] U.S. Cl. ...................... 342/51; 327/131
[58] Field of Search .............. 342/51; 307/228; 331/117 FE; 327/131, 132, 134

[56] References Cited

U.S. PATENT DOCUMENTS

| | | | |
|---|---|---|---|
| 3,659,115 | 4/1972 | Montogomery | 307/228 |
| 3,851,301 | 11/1974 | Demers et al. | 340/588 |
| 4,129,868 | 12/1978 | Tahara et al. | 342/51 |
| 4,131,807 | 12/1978 | Korver | 307/228 |
| 4,885,588 | 12/1989 | Kawakami | 342/51 |
| 4,980,689 | 12/1990 | Kawakami | 342/51 |
| 5,065,160 | 11/1991 | Kawakami | 342/51 |

OTHER PUBLICATIONS

Y. Kawakami et al., "Frequency Sweep Characteristic of 9GHz Radar Transponder Module", Electric Conference Kansai Branch Meeting 1992, G251 F7-13, 1992.

*Primary Examiner*—Ian J. Lobo
*Attorney, Agent, or Firm*—Rothwell, Figg, Ernst & Kurz

[57] ABSTRACT

A control circuit of a rader transponder produces pulses when the radar transponder detects a radio wave from a search radar. The pulses are sent to a sweep signal generator in which sawtooth waves are obtained through a first constant current circuit for linearizing the voltage-to-time characteristic in a falling portion of a sawtooth. The sweep signal generator further has a second constant current circuit for linearizing the voltage-to-time characteristic in a rising portion of a sawtooth.

9 Claims, 13 Drawing Sheets

DESCRIPTION OF PREFERRED EMBODIMENTS

RADAR TRANSPONDER

BACKGROUND OF THE INVENTION

1. Field of the Invention

The present invention generally relates to a radar transponder, and especially to a radar transponder used for search and rescue.

2. Description of the Prior Art

FIG. 12 is a block diagram showing a conventional radar transponder for search and rescue. In FIG. 12, numeral 1 denotes a receiving antenna for receiving a signal from a search radar, numeral 2 denotes a field effect transistor (FET) amplifier connected to the receiving antenna 1, numeral 3 denotes a diode direct detector connected to the FET amplifier 2, numeral 4 denotes a video amplifier connected to the diode direct detector 3, numeral 5 denotes a control circuit connected to the video amplifier 4, numeral 6 denotes a transmission gate circuit connected to the control circuit 5, numeral 7 denotes a sweep signal generator connected to the control circuit 5, numeral 8 denotes a microwave oscillator connected to both the transmission gate circuit 6 and the sweep signal generator 7, numeral 9 denotes a transmitting antenna connected to the microwave oscillator 8.

The antenna 1 receives a signal transmitted by a search radar. The signal is amplified by the FET amplifier 2 and detected by the diode direct detector 3. The detected signal from the diode direct detector 3 is amplified by the video amplifier 4 to a level necessary to trigger the control circuit 5. When the control circuit 5 is triggered by the detected signal, it produces pulses indicating a transmission time and sends them to both the transmission gate circuit 6 and the sweep signal generator 7. The sweep signal generator 7 has the sawtooth wave generator 12 as, for example, shown in FIG. 13. In response to a pulse from the control circuit 5, the sweep wave generator 7 outputs the predetermined required number of sawtooth wave signals to the microwave oscillator 8. A transmission gate pulse from the transmission gate circuit 6 is inputted to the microwave oscillator 8, and the oscillator 8 oscillates for time period corresponding to the gate pulse and performs a frequency sweep in a frequency range corresponding to voltage of sawtooth wave from sweep signal generator 12. A transmission signal from the microwave oscillator 8, which sweeps in the frequency range is radiated by the transmitting antenna 9 as a radio wave.

The sawtooth wave generator 12 includes, at the output end, a parallel circuit constituted of a resistor 10 and capacitor 11 as shown in FIG. 13. Therefore, a current discharged from the capacitor 11 through a resistor 10 is generally expressed by a function exp(t) where t represents time. The sawtooth wave signal outputted from the signal generator 7 to the microwave oscillator 8 is affected by this function exp(t) and shows voltage-to-time characteristics of downward convexity in the falling portion as shown in FIG. 14. Now, assume that the microwave oscillator 8 has frequency-to-sweep voltage characteristics in a prescribed frequency range ΔF as shown in the FIG. 15. When such a sawtooth wave signal as that shown in the FIG. 14 is inputted to the microwave oscillator 8, a response wave in the prescribed main sweep time period in the prescribed frequency range ΔF shows frequency-to-time characteristics of downward convexity as shown in FIG. 16. Therefore, as in FIG. 16, the sweeping time Δt1 of the response wave from a radar transponder, corresponding to the frequency range Δf1, becomes shorter. Because of this, it may happen that the level of the response signal does not reach to a desired level. The search radars include many types having different property such as a receiving frequency band and some of them may not receive a response wave properly if the wave does not have a sufficient level.

Furthermore, as shown in FIG. 17, a sawtooth wave outputted from the sawtooth wave generator 12 has characteristics of S-shaped curve and accordingly a response wave in a return sweep has frequency-to-time characteristics of S-shaped curve in the prescribed main sweep time period in the prescribed frequency range ΔF as shown in FIG. 18. Therefore, as shown in FIG. 18, sweeping time period Δt2 in a return sweep of a response wave, corresponding to frequency range Δf2, becomes shorter and some of the search radars may not detect the radiated response signal.

The related technology is described in the document "linearization of frequency sweep characteristics in 9 GHz radar transponder module", preliminary thesis, page G251, thesis number G7-13, presented at Kansai branch conference of electric-related society.

As explained above, in the conventional radar transponder, a sawtooth wave signal outputted from sawtooth wave generator 12 has the frequency-to-time characteristics of convexity in the falling portion or S-shaped curve in the rising portion. Accordingly, a response wave from the radar transponder has only a short frequency sweep time in the prescribed frequency range in the prescribed main sweep time period or in the prescribed return sweep and this raise a problem that some of the radars, which use a certain frequency band do not receive such response signals properly.

SUMMARY OF THE INVENTION

In view of the foregoing, an object of the present invention is to provide a radar transponder transmitting a response wave which a search radar using any frequency band can detect by keeping a sufficient effective frequency sweep time period in a main sweep or in a return sweep.

In order to accomplish the above object, a radar transponder of the present invention has a sawtooth wave circuit in which a first constant current circuit is provided for linearizing voltage-to-time characteristics in a falling portion of a sawtooth wave. Accordingly, frequency-to-time characteristic of a response wave in a main sweep becomes nearly linear so that a sufficient effective main sweep time period in a prescribed frequency range is obtained. Further, a second constant current circuit is provided in the sawtooth wave circuit for linearizing voltage-to-time characteristics in a rising portion of a sawtooth wave. Accordingly, frequency-to-time characteristic of a response wave in a main sweep becomes nearly linear so that a sufficient return sweep time period in a prescribed frequency range is obtained.

DETAILED DESCRIPTION OF THE PREFERRED EMBODIMENTS

The preferred embodiments of the present invention will be described in detail with reference to the drawings.

EMBODIMENT 1

Figure 1:
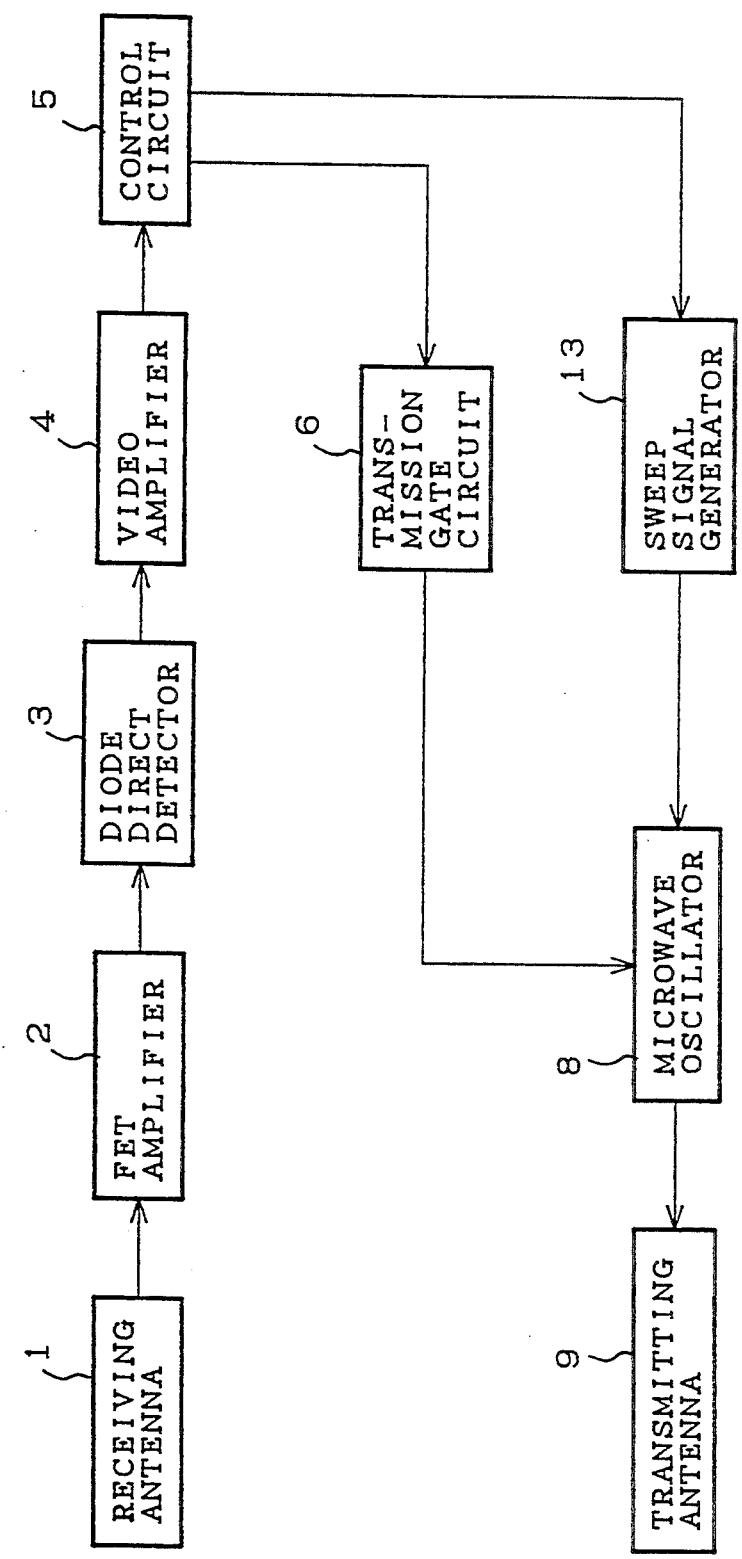
FIG. 1 is a block diagram showing the configuration of a radar transponder of the first embodiment of the present invention.

FIG. 1 is a block diagram showing the configuration of a radar transponder of an embodiment of the present invention.

Figure 12:
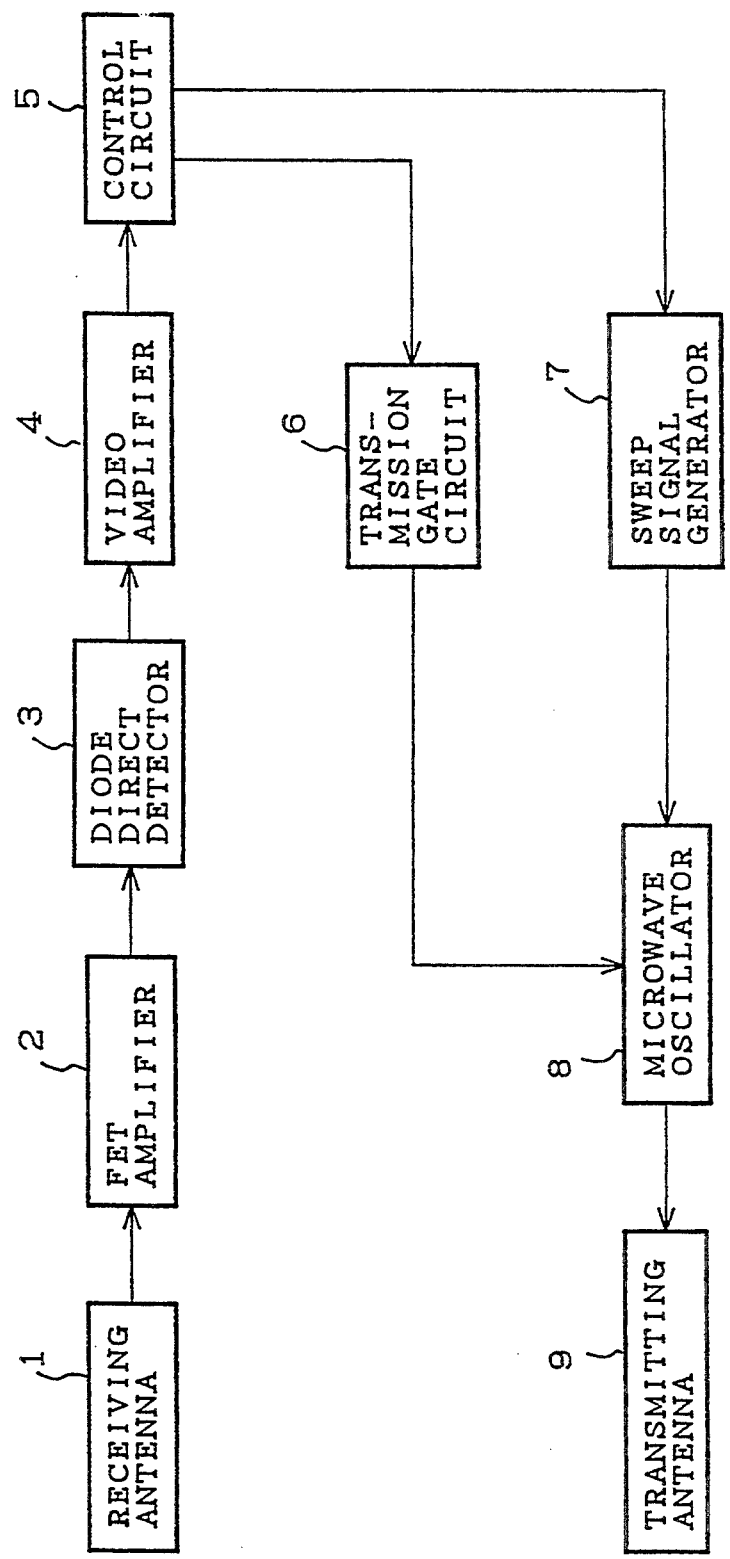
FIG. 12 is a block diagram showing a configuration of a conventional radar transponder for search and rescue.
Figure 13:
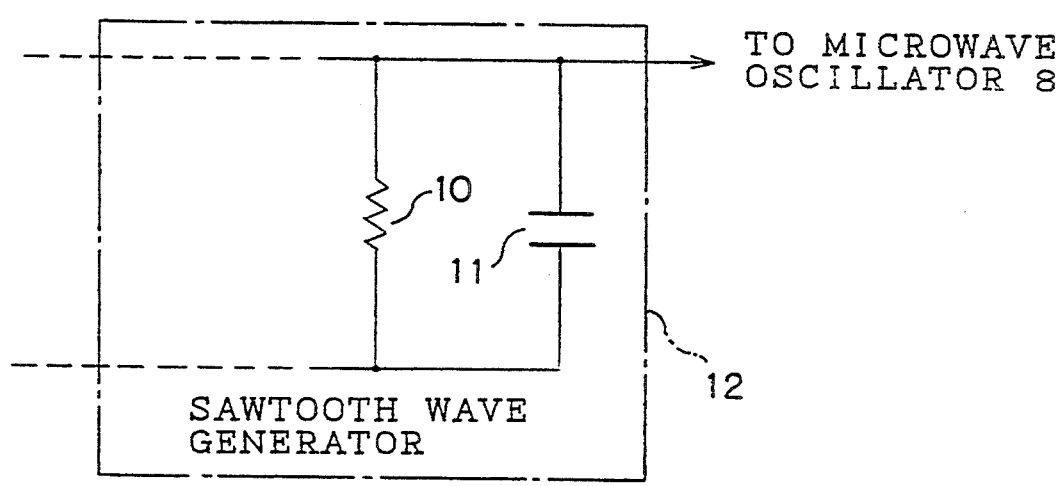
FIG. 13 is a circuit diagram showing the output end portion of the sawtooth wave generator of a conventional radar transponder.
Figure 14:
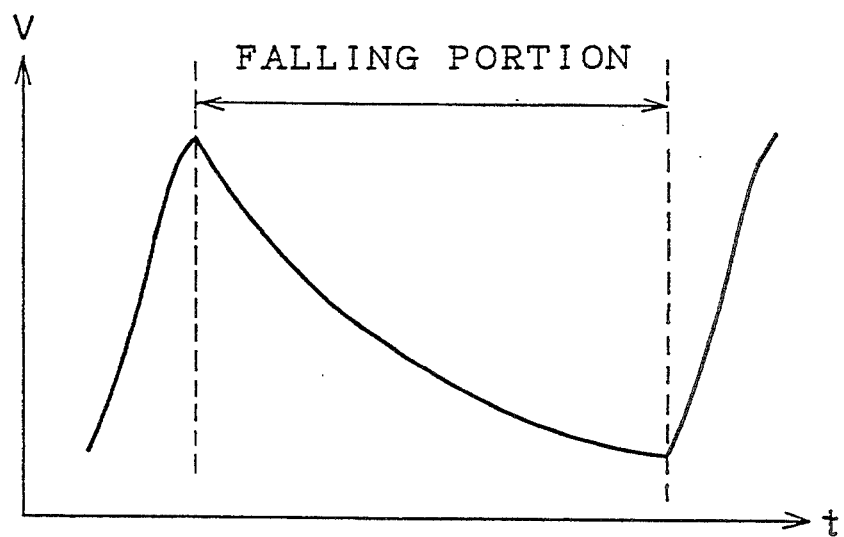
FIG. 14 is a graph showing a falling portion of the sawtooth wave outputted from the sweep signal generator of a conventional radar transponder.
Figure 15:
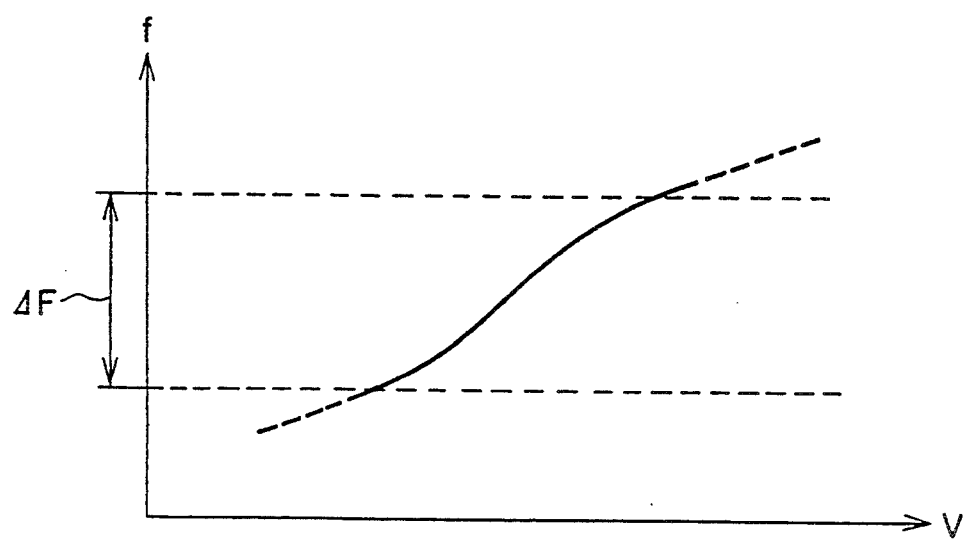
FIG. 15 is a graph showing frequency-to-voltage characteristics of a microwave oscillator.
Figure 16:
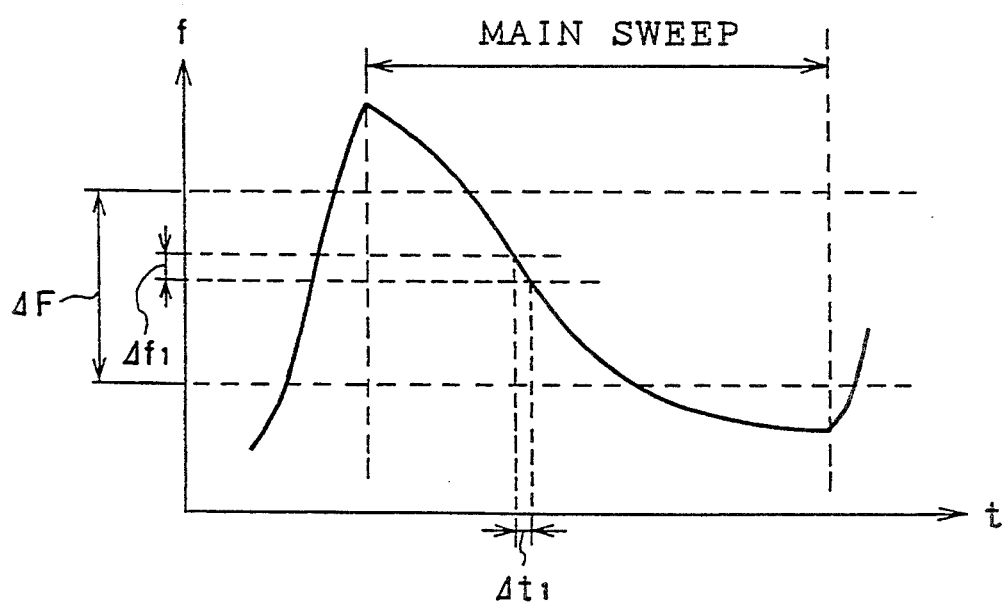
FIG. 16 is a graph showing a main sweep of a response signal outputted from the microwave oscillator of a conventional radar transponder.
Figure 17:
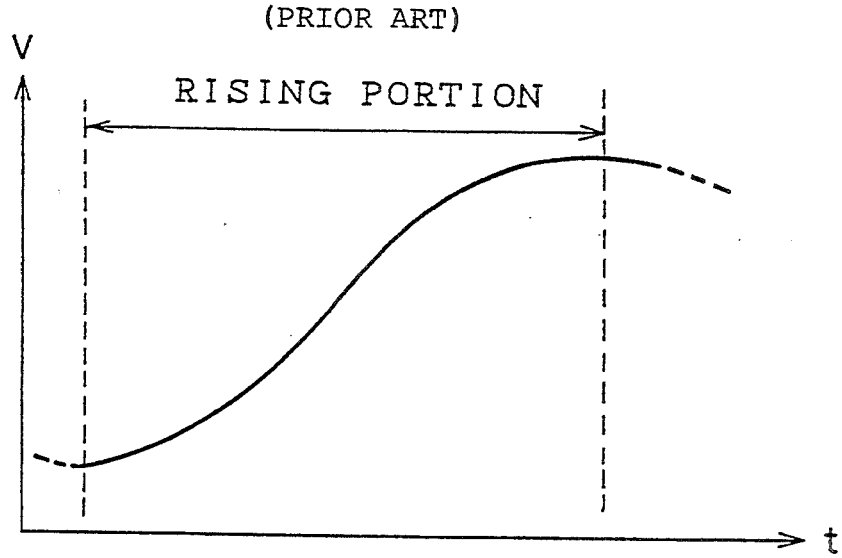
FIG. 17 is a graph showing the rising portion of a sawtooth wave outputted from the sawtooth wave generator of a conventional radar transponder.
Figure 18:
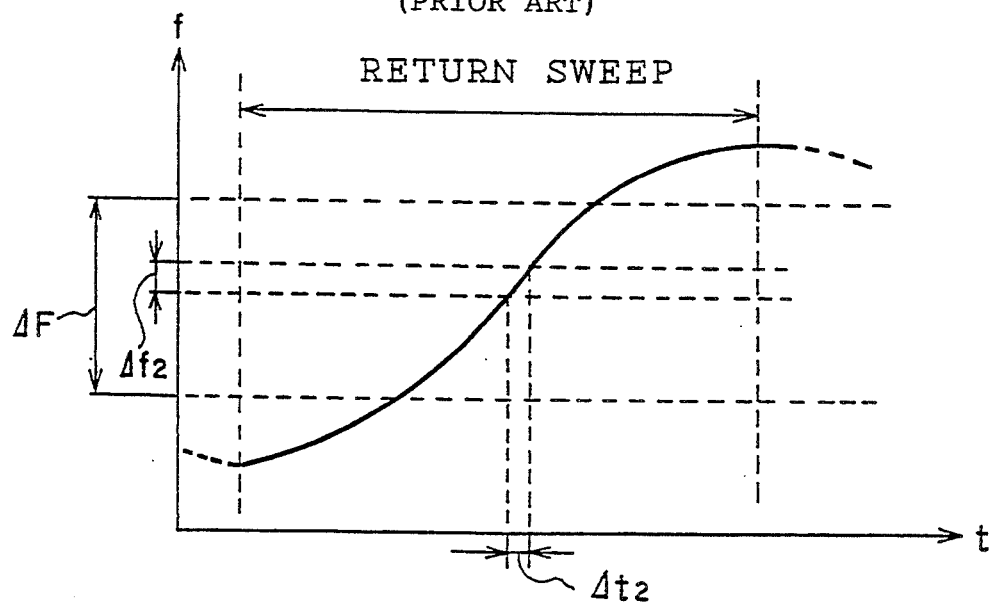
FIG. 18 is a graph showing a return sweep of a response signal output ted from the microwave oscillator of a conventional radar transponder.

In FIG. 1, numeral 1 denotes a receiving antenna, numeral 2 denotes a Field Effect Transistor (FET) amplifier, numeral 3 denotes a diode direct detector, numeral 4 denotes a video amplifier, numeral 5 denotes a control circuit, numeral 6 denotes a transmission gate circuit, numeral 8 denotes a microwave oscillator, numeral 9 denotes a transmitting antenna. The same reference numerals are attached to the same portions as in FIG. 12 and the detailed explanations are omitted. Numeral 13 denotes a sweep signal generator including a constant current circuit for linearizing the voltage-to-time characteristic in the falling portion of the sawtooth wave signal outputted from sawtooth generator provided in the sweep signal generator.

Figure 2:
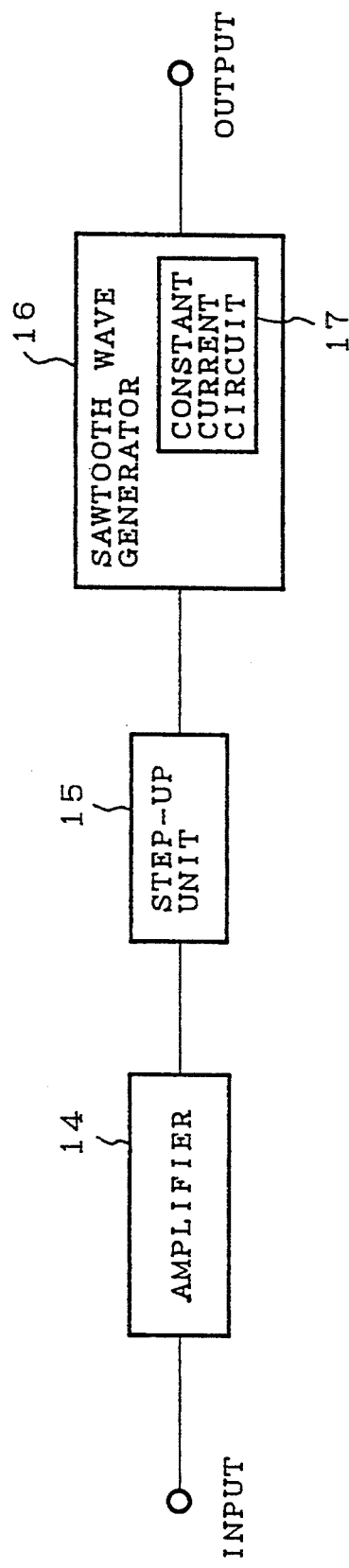
FIG. 2 is a block diagram showing a configuration of the sweep signal generator of the first embodiment of the invention.

Next, the sweep signal generator 13 will be explained by referring to FIG. 2. FIG. 2 is a block diagram showing a configuration of the sweep signal generator 13. In FIG. 2, numeral 14 denotes an amplifier which amplifies pulses inputted from control circuit 5 to a predetermined level, numeral 15 denotes a step-up unit which increases voltage of the signal outputted from the amplifier 14 to a predetermined level, numeral 16 denotes a sawtooth wave generator which generates and outputs a predetermined required number of sawtooth wave signals to the microwave oscillator 8 using the increased voltage pulses.

Figure 3:
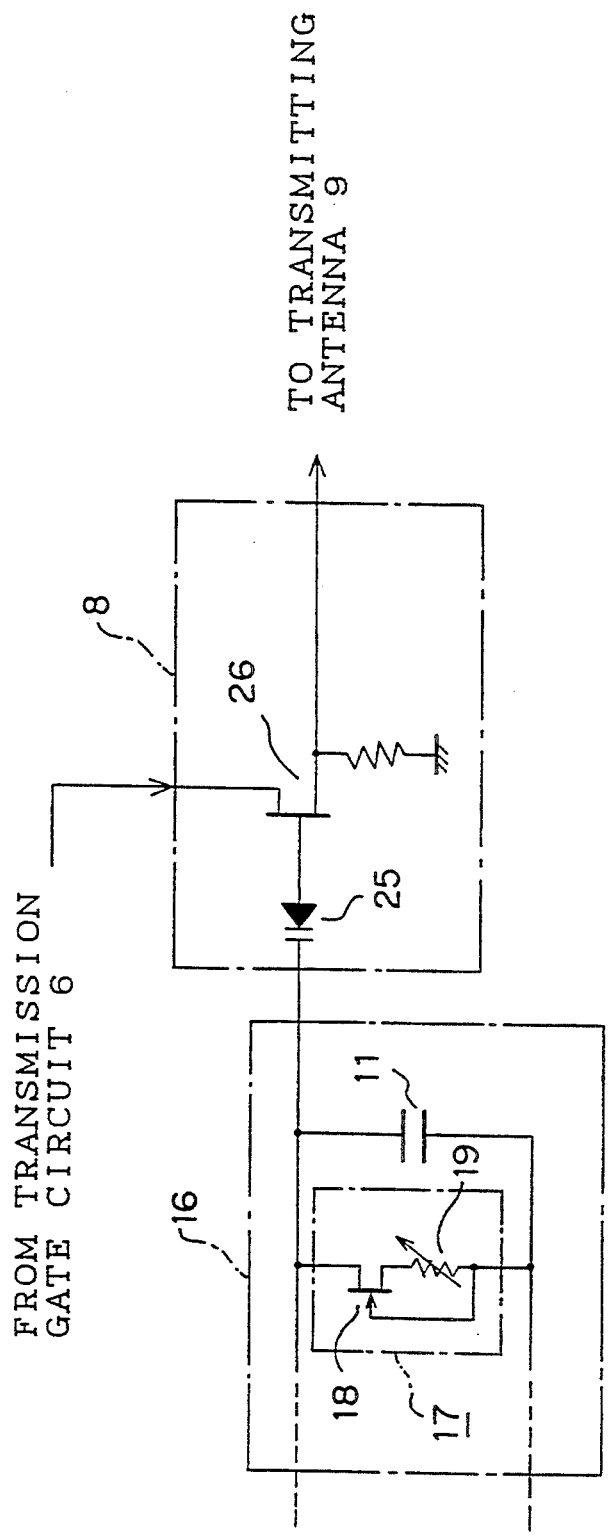
FIG. 3 is a circuit diagram of the output end of the sawtooth wave generator and the microwave oscillator of the first embodiment of the invention.

FIG. 3 is a circuit diagram of the sawtooth wave generator 16 and the microwave oscillator 8. At the output end of the sawtooth wave circuit 16, provided is a parallel circuit of capacitor 11 and constant current circuit 17 for the falling portion of the sawtooth. The constant current circuit is constituted of a Junction FET (JFET) 18 and a variable resistor 19 connected to the source of the JFET 18. The gate of the JFET is connected below the resistor 19.

As shown in FIG. 3, the microwave oscillator 8 has a simple configuration which includes a varactor diode 25 and an FET amplifier 26. The detail of the oscillator 8 will be explained later in view of the relationship with the step-up unit 15.

The antenna 1 receives a signal transmitted by a search radar. The signal is amplified by the FET amplifier 2 and detected by the diode direct detector 3. The detected signal from the diode direct detector 3 is amplified by the video amplifier 4 to a level necessary to trigger the control circuit 5. When the control circuit 5 is triggered by the detected signal, the control circuit 5 produces pulses indicating a transmission time and sends them to both the transmission gate circuit 6 and the sweep signal generator 13 having a constant current circuit 17 for the falling portion of the sawtooth wave. In response to a pulse from the control circuit 5, the sweep wave generator 13 outputs the predetermined required number of sawtooth wave signals to the microwave oscillator 8. A transmission gate pulse from the transmission gate circuit 6 is inputted to the microwave oscillator 8 and the oscillator 8 oscillates for the time period based on the transmission gate pulse, while sweeping in a prescribed frequency range. A transmission signal from the microwave oscillator 8 is radiated by the transmitting antenna 9 as a radio wave. A series of this operations are basically the same as those of the conventional radar transponder shown in FIG. 12.

The sweep signal generating circuit 13 receives pluses from the control circuit 5 and amplifies them at the amplifier 14. The voltage of the amplified signal is increased by step-up unit 15 and is sent to the sawtooth wave generator 16. As shown in FIG. 3, the constant current circuit 17 is connected to the capacitor 11 in parallel. The constant current circuit 17 is constituted of a JFET 18 and variable resistor 19 connected to the source of the JFET 18. When the sawtooth generating circuit 16 generates sawtooth waves in response to the signals from the step-up unit 15, a current discharged from the capacitor 11 flows between the drain and the source of the JFET 18. Therefore, it is possible for the current flowing between the drain and the source of the JFET 18 to be constant to time by setting the JFET 18 in a pinch-off state by adjusting the variable resistor 19.

Figure 4:
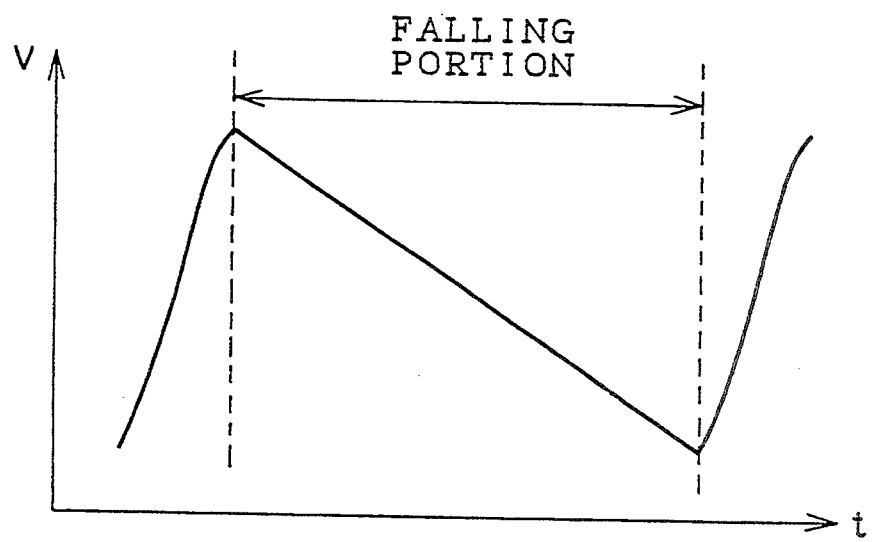
FIG. 4 is a graph showing a falling portion of a sawtooth wave outputted from the sweep signal generator of the first embodiment of the invention.
Figure 5:
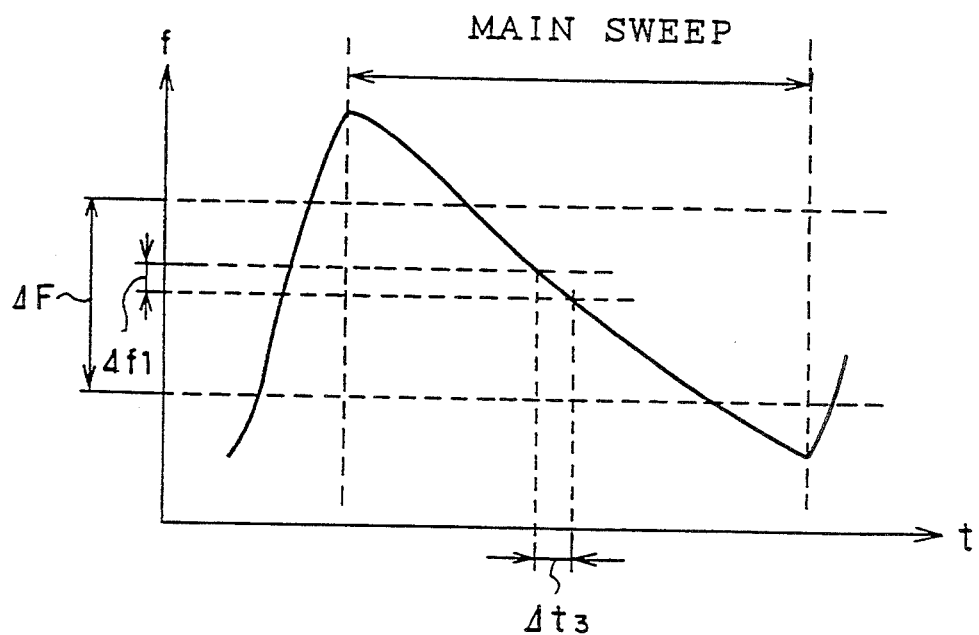
FIG. 5 is a graph showing a main sweep of the signal outputted from the microwave oscillator of the first embodiment of the invention.

When a current flowing between the drain and the source of the JFET 18 becomes constant to time, voltage discharged from the capacitor 11 varies at a constant rate. Therefore, the voltage-to-time characteristic of the sawtooth wave from the sweep signal generator 13 becomes linear in the falling portion as shown in FIG. 4. Accordingly, frequency-to-time characteristic of a response wave in the prescribed frequency range $\Delta F$ in a main sweep is nearly linear as shown in FIG. 5. Thus, if a search radar has a frequency band $\Delta f1$, frequency sweep time in a main sweep of a response wave from a radar transponder has a time period of $\Delta t3$ shown in FIG. 5. Namely, frequency sweep time becomes long enough for a search radar to detect a response wave. In other words, the radar transponder may transmit a response wave which any search radar is able to receive, as long as it has a receiving band within the prescribed frequency range $\Delta F$.

The feature of the above embodiment of the present invention will be further explained.

Generally, a radar transponder for search and rescue is designed to receive a signal transmitted from a search radar and to transmit a response signal in a frequency band which the receiving unit of the search radar is able to receive. Specifications of a response wave, including frequency used, output level, number of outputs are determined by a standard to some extent and a radar transponder is designed to follow the standard. For example, according to CCIR recommendation 628 or MSC 53/54 annex 8, a response wave must perform a main sweep 12 times in a frequency range from 9.2 GHz to 9.5 GHz during a main sweep time period of 7.5+0.1 msec and the response wave must perform a return sweep 12 times in a frequency range from 9.2 GHz to 9.5 GHz during a return sweep time period of 0.4+0.1 msec.

Figure 6:
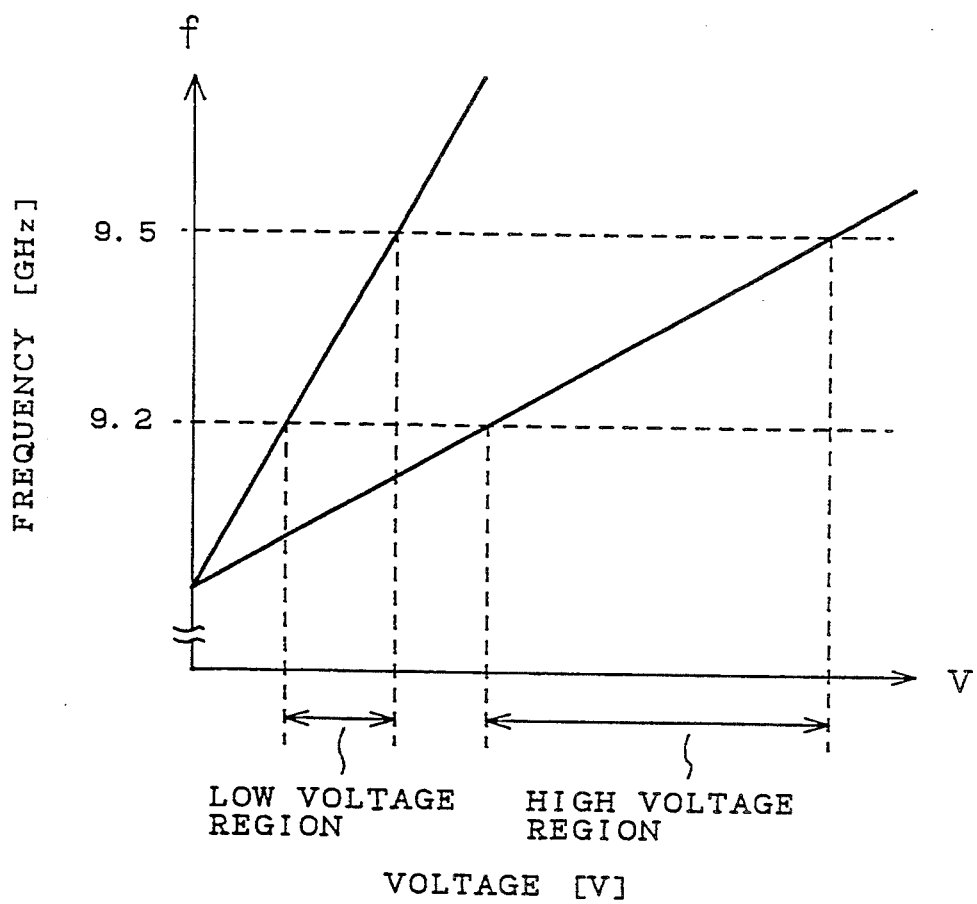
FIG. 6 is a graph showing frequency characteristics of a voltage controlled oscillator

In a radar transponder, a response wave is greatly affected by properties of the oscillator. Next, the properties of the oscillator will be explained. FIG. 6 is a graph showing frequency characteristic of a voltage controlled oscillator (VCO). As shown in FIG. 6, when a VCO having a frequency band from 9.2 GHz to 9.5 GHz is employed for example, if the VCO is of a type driven by voltage in the low voltage region, the VCO must have a large gradient property. On the other hand, if the VCO is of a type driven by voltage in the high voltage region, it is sufficient that the VCO has a small gradient property.

If a VCO having a large gradient property is used, the amount of a change in frequency to a change in voltage is larger than that of a VCO having a small gradient property. Therefore, a VCO with a large gradient property is easily affected by an undesired voltage change and the output frequency is fluctuated. In order to obtain a stable desired frequency output, a stabilizing means and so forth must be provided in or out of the oscillator.

The present invention also solves the above problem and provides a transponder which transmits a response wave which any search radars receive with high reliability in a simple configuration.

In the present embodiment, the constant current circuit 17 is provided at the output end of the sawtooth wave generator 16 in order to linearize voltage-to-time characteristics of sawtooth wave outputted from the sawtooth wave generator 16. However, one of the causes of the concave or S-shaped distortion is also related to frequency-to-voltage characteristic of the oscillator. Therefore, even if the linearization of voltage-to-time characteristic is obtained, if a VCO with a large gradient property is employed, there is a possibility that finally obtained frequency-to-time characteristic of microwave oscillator 8 is not perfectly linear. Thus, in this embodiment, an oscillator having a small gradient property is used. Further, the oscillator has a simple configuration including a varactor diode 25 and an FET amplifier 26 and may obtain stable frequency output without a special frequency stabilizing means.

A wide range of voltage must be inputted to the VCO having a small gradient property. Therefore, in this embodiment, the sweep signal generator 13 has a step-up unit 15 in order to obtain the wide range of voltage. This step-up unit 15 can be constituted of a pulse transformer.

A small sized radar transponder can be obtained with a simple configuration explained above. Further, lightweight and small capacity of battery are great advantages especially for a search radar which must be made in a small size.

EMBODIMENT 2

The above embodiment describes linearization of frequency-to-time characteristic in a main sweep of a response wave. The present invention is also applied to linearization of frequency-to-time characteristic in a return sweep of a response wave.

Figure 7:
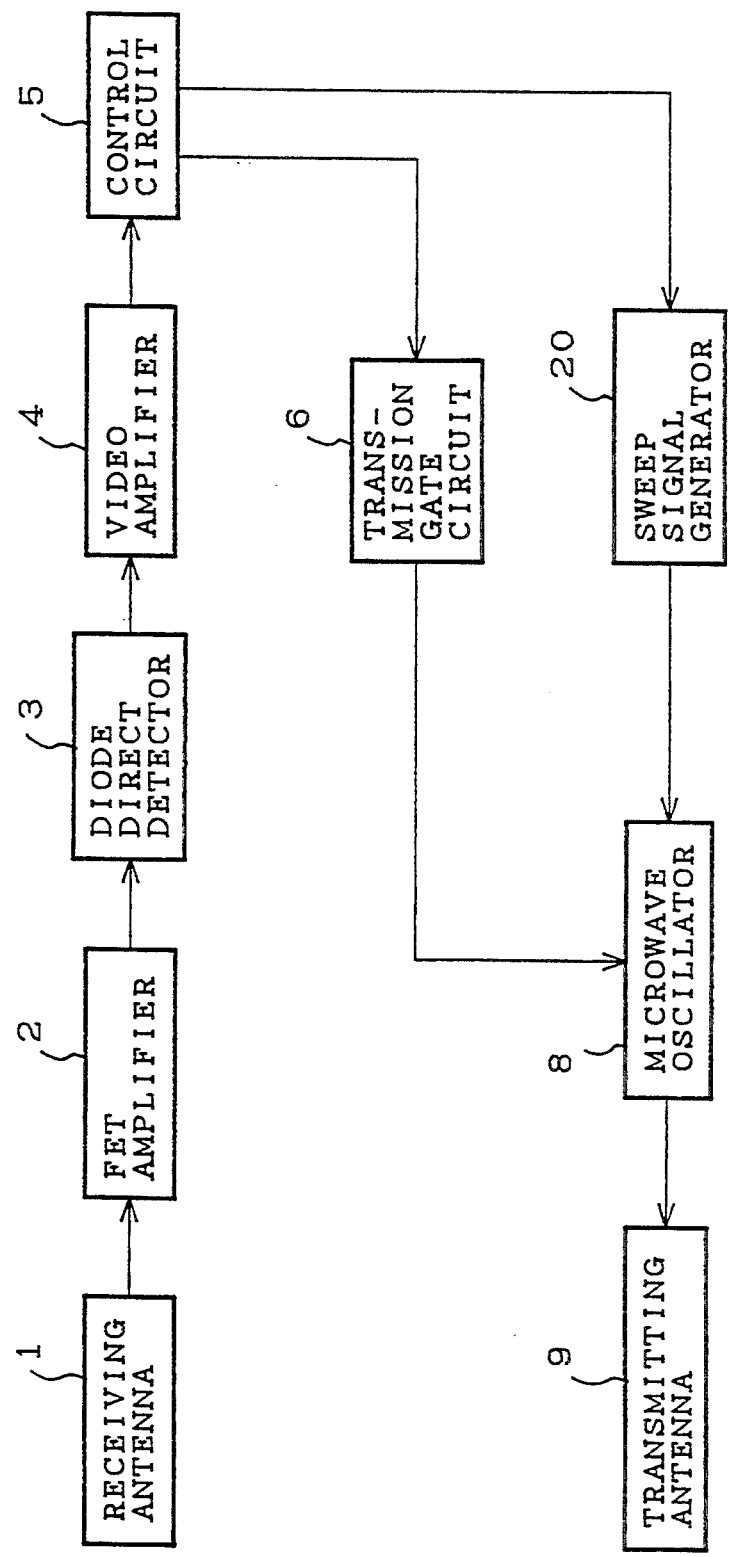
FIG. 7 is a block diagram showing a configuration of a radar transponder according to the second embodiment of the present invention.

FIG. 7 is a block diagram showing a configuration of a radar transponder according to the second embodiment. The same numerals are attached to the same portions as those in FIG. 1 and explanations thereof are omitted. In FIG. 7, numeral 20 denotes a sweep signal generator. This sweep signal generator 20 differs from the sweep signal generator 13 shown in FIG. 1 in that it further has a constant current circuit for the rising portion of a sawtooth wave outputted from the sawtooth wave generator 13.

Figure 8:
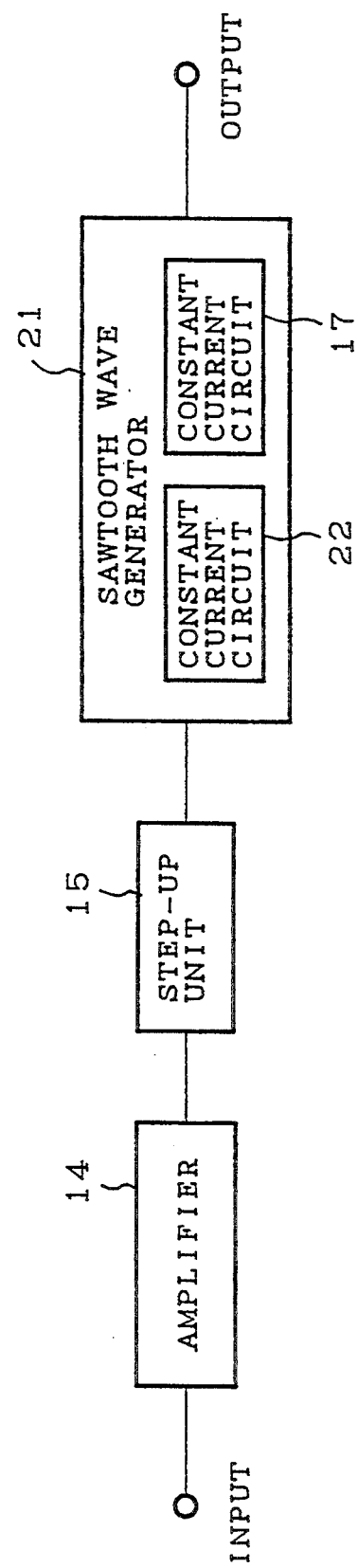
FIG. 8 is a block diagram showing a configuration of the sweep signal generator of the second embodiment of the invention.
Figure 9:
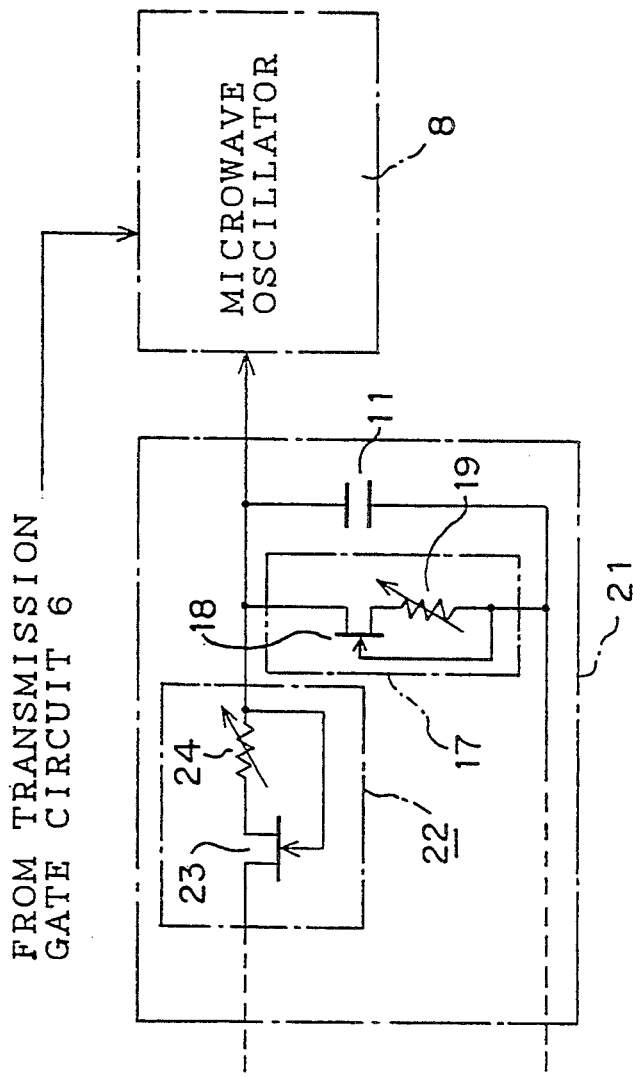
FIG. 9 is a circuit diagram of an output end portion of the sawtooth wave generator of the second embodiment of the invention.

FIG. 8 is a block diagram showing a configuration of the sweep signal generator 20. In FIG. 8, numeral 21 denotes a sawtooth wave generator. The sawtooth wave generator 21 differs from the sawtooth wave generator in that it further has a constant current circuit 22 for linearizing the rising portion of the sawtooth wave. FIG. 9 is a circuit diagram of an output end portion of the sawtooth wave generator 21. In FIG. 9, numeral 23 denotes a JFET, numeral 24 denotes a variable resistor. One end of the variable resistor 24 is connected to the source of the JFET 23 and the gate of the JFET 23 is connected to the other end of the variable resistor 24. The JFET 23 and resistor 24 form a constant current circuit 22 for linearizing the rising portion of the sawtooth wave. The same numerals are attached to the same portions as those in FIG. 3.

Basic operations of the radar transponder of this embodiment and operations concerning linearization of the frequency-to-time characteristic in a main sweep of a response wave are the same as those of the first embodiment. Therefore, only operations for linearizing frequency-to-time characteristics in a return sweep of a response wave will be explained below.

When the sawtooth wave generator 21 generates a sawtooth wave signal in response to the signal from the step-up unit 15, a current discharged from the capacitor 11 flows between the drain and the source of the JFET 23. Therefore, it is possible for the current flowing between the drain and the source of the JFET 23 to be constant to time by setting the JFET 23 in a pinch-off state by adjusting the variable resistor 24.

Figure 10:
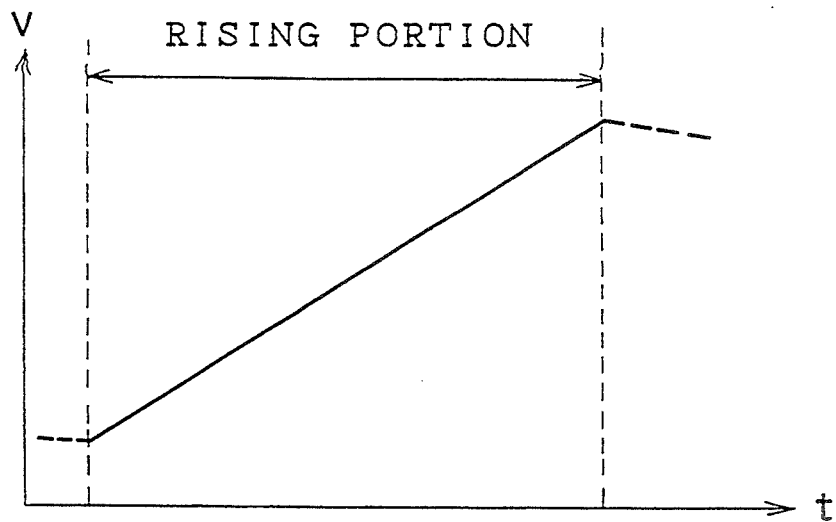
FIG. 10 is a graph showing a rising portion of a sawtooth wave outputted from the sweep signal generator of the second embodiment of the invention.
Figure 11:
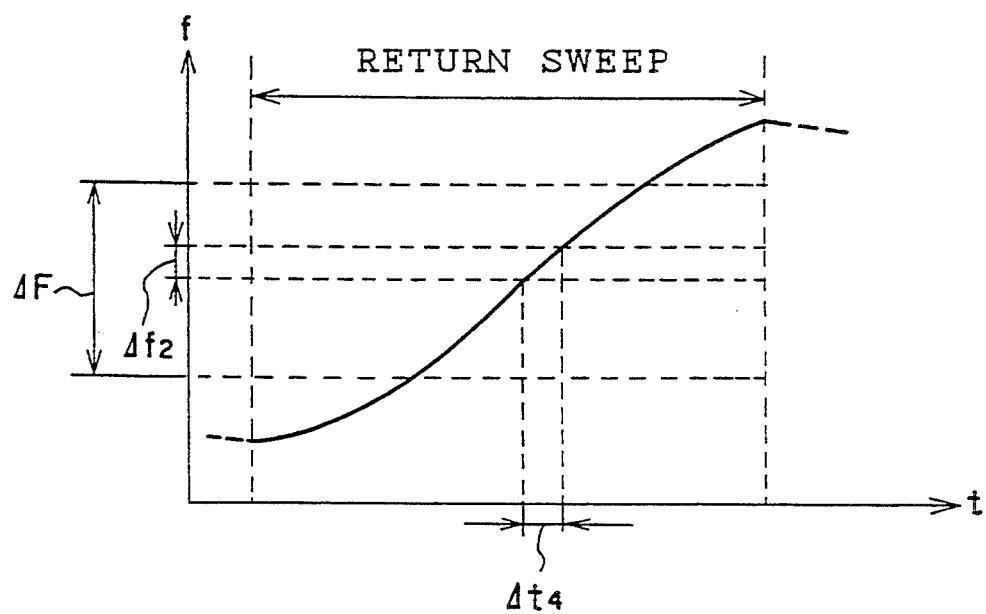
FIG. 11 is a graph showing a return sweep of the signal outputted from the microwave oscillator of the second embodiment of the invention.

When a current flowing between the drain and the source of the JFET 23 becomes constant to time, voltage to be charged to the capacitor 11 varies at a constant rate. Therefore, the voltage-to-time characteristic of the sawtooth wave from the sweep signal generator 20 becomes linear in the rising portion as shown in FIG. 10. Accordingly, frequency-to-time characteristic of a response wave in the prescribed frequency range $\Delta F$ in a return sweep is nearly linear as shown in FIG. 11. Thus, if a search radar has a frequency band $\Delta f2$, frequency sweep time in a return sweep of a response wave from a radar transponder has a time period of $\Delta t4$ shown in FIG. 11. Namely, frequency sweep time becomes long enough for a search radar to detect a response wave. In other words, the radar transponder may transmit a response wave which any search radar is able to receive, as long as it has a receiving band within the prescribed frequency range $\Delta F$.

What is claimed is:

1. A radar transponder, comprising:
   means for detecting a radio wave transmitted by a search radar;
   means for producing a predetermined number of pulses when the detecting means detects the radio wave;
   a sweep signal generator for generating sawtooth wave signals of rising and falling signal magnitudes responsive to said pulses, said signal generator having a capacitor and a first constant current circuit, the capacitor and the first constant current circuit being connected in parallel with each other, the sweep signal generator converting the predetermined pulses into sawtooth wave signals with the capacitor and the first constant current circuit functioning to substantially linearize the signal-time characteristic of said falling signal magnitudes of said sawtooth wave signals; and
   a microwave oscillator producing a microwave which sweeps in a predetermined range of frequency based on the sawtooth wave signals.

2. A radar transponder according to claim 1, wherein the sweep signal generator further includes a second constant current circuit connected to the capacitor in series.

3. A radar transponder according to claim 1, wherein the first constant current circuit includes a first junction field effect transistor and a first resistor one end of which is connected to a source of the first junction field effect transistor, a gate of the first junction field effect transistor is connected to the other end of the first resistor.

4. A radar transponder according to claim 2, wherein the second constant current circuit includes a second junction field effect transistor and a second resistor one end of which is connected to a source of the second junction field effect transistor, a gate of the second field effect transistor is connected to the other end of the second resistor.

5. A radar transponder according to claim 2, wherein the second constant current circuit includes a second junction field effect transistor and a second resistor one end of which is connected to a source of the second junction field effect transistor, a gate of the second field effect transistor is connected to the other end of the second resistor.

6. A radar transponder according to claim 5, wherein the first and second resistors are adjusted such that the first and second junction field effect transistors are set in a pinch-off state.

7. A radar transponder according to claim 1, wherein the sweep signal generator includes a step-up unit which increase voltage of the pulses.

8. A radar transponder according to claim 7, wherein the set-up unit includes a pulse transformer.

9. A radar transponder according to claim 8, wherein the microwave oscillator is constituted of a varactor diode and an field effect transistor.

* * * * *

UNITED STATES PATENT AND TRADEMARK OFFICE
CERTIFICATE OF CORRECTION

PATENT NO. : 5,442,357
DATED : August 15, 1995
INVENTOR(S) : Tohru Dochi

It is certified that error appears in the above-indentified patent and that said Letters Patent is hereby corrected as shown below:

Col. 5, line 36, "0.4 + 0.1" should be --

Signed and Sealed this

Second Day of January, 1996

*Attest:*

BRUCE LEHMAN

*Attesting Officer*   *Commissioner of Patents and Trademarks*